United States Patent
Jang (10) Patent No.: US 9,680,999 B2
(45) Date of Patent: Jun. 13, 2017

(54) APPARATUS AND METHOD FOR REMOVING ACOUSTIC ECHO IN TELECONFERENCE SYSTEM

(71) Applicant: Electronics and Telecommunications Research Institute, Daejeon (KR)

(72) Inventor: Inseon Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 497 days.

(21) Appl. No.: 14/266,616

(22) Filed: Apr. 30, 2014

(65) Prior Publication Data

US 2015/0133097 A1 May 14, 2015

(30) Foreign Application Priority Data

Nov. 8, 2013 (KR) .......................... 10-2013-0135824

(51) Int. Cl.
*H04M 9/08* (2006.01)
*H04M 3/56* (2006.01)
*H04M 1/64* (2006.01)

(52) U.S. Cl.
CPC .................... *H04M 3/568* (2013.01)

(58) Field of Classification Search
CPC ....................................................... H04B 3/23
USPC .................. 379/88.01–88.19, 406.01–406.16
See application file for complete search history.

(56) References Cited

U.S. PATENT DOCUMENTS

| | | | | |
|---|---|---|---|---|
| 2007/0189505 A1* | 8/2007 | Dyba | ..................... | H04B 3/237 379/406.01 |
| 2013/0022206 A1* | 1/2013 | Thiergart | .............. | G10L 19/008 381/17 |
| 2014/0347565 A1* | 11/2014 | Fullam | ................... | H04N 5/607 348/738 |
| 2015/0036847 A1* | 2/2015 | Donaldson | .............. | H04S 7/303 381/303 |
| 2015/0036848 A1* | 2/2015 | Donaldson | .............. | H04S 7/303 381/303 |

(Continued)

FOREIGN PATENT DOCUMENTS

| | | |
|---|---|---|
| JP | 2011-182292 A | 9/2011 |
| KR | 10-2000-0020903 A | 4/2000 |
| KR | 10-2000-0051747 A | 8/2000 |

OTHER PUBLICATIONS

Han-Gil Moon et al., "Multi-Channel Audio Coding Method with Virtual Source Location Information", The Acoustical Society of Korea, Proceedings of the Acoustical Society of Korea Conference, Nov. 2004, pp. 165-168, vol. 23, No. 2.

(Continued)

*Primary Examiner* — Solomon Bezuayehu (57) ABSTRACT

An acoustic echo removing apparatus detects space information representing a location of a sound source using a plurality of microphone input signals that are received through a plurality of microphones, and generates an acoustic echo estimation signal from a far-end talker voice signal using an adaptive filter coefficient. The acoustic echo removing apparatus detects a double talk segment using the space information, and determines update of the adaptive filter coefficient according to whether the double talk segment exists.

9 Claims, 4 Drawing Sheets

(56) References Cited

U.S. PATENT DOCUMENTS

2015/0063579 A1* 3/2015 Bao ...................... H04M 9/082
                                                                                      381/66

OTHER PUBLICATIONS

Jou-Won Ahn et al., "The Wavelet Transform Based Subband Adaptive Acoustic Echo Canceller Using a Double Talk Detector", The Korea Institute of Signal Processing and Systems, Journal of the Institute of Signal Processing and Systems, Oct. 2000, pp. 161-164, vol. 1, No. 1.

* cited by examiner

APPARATUS AND METHOD FOR REMOVING ACOUSTIC ECHO IN TELECONFERENCE SYSTEM

CROSS-REFERENCE TO RELATED APPLICATION

This application claims priority to and the benefit of Korean Patent Application No. 10-2013-0135824 filed in the Korean Intellectual Property Office on Nov. 8, 2013, the entire contents of which are incorporated herein by reference.

BACKGROUND OF THE INVENTION (a) Field of the Invention

The present invention relates to a method and apparatus for removing acoustic echo in a teleconference system. More particularly, the present invention relates to a method and apparatus for removing acoustic echo in a teleconference system using a handsfree terminal.

(b) Description of the Related Art

As the demand for convenience in a wireless mobile communication environment increases, interest in handsfree communication and audiovisual communication is also increasing. In such handsfree communication, because of a small and narrow space such as in a vehicle, and in audio-visual communication, because of a short distance between a microphone and a speaker due to down-sizing of a terminal, acoustic echo may occur.

Acoustic echo indicates that a sound signal of another party (far-end talker) that is output from a speaker is changed to an acoustic echo signal through an echo path, is input to a microphone of a user (near-end talker), and is transferred to another party.

In a telepresence system or a teleconference system for smart work, because a conference is implemented using a speaker, it is very important to remove acoustic echo. That is, in a teleconference system, a near-end talker voice signal is bidirectionally transferred, and for example, when implementing a teleconference using a handsfree terminal, an acoustic echo component of a user A (far-end talker) is overlapped with a voice signal of another user B (near-end talker) and is input to a microphone, thereby deteriorating sound quality, and thus in order to improve audio dedicated communication QoS, a function of removing the acoustic echo component is necessary.

A typical method of removing acoustic echo is a method of using a digital adaptive filter. An acoustic echo removing apparatus using an adaptive filter removes an influence of an acoustic echo signal through an echo path from an input voice signal of a microphone using an adaptive filter having an adaptive filter coefficient with reference to a speaker output voice signal. However, the acoustic echo removing apparatus using an adaptive filter has a problem that performance is greatly deteriorated, as distortion such as divergence of an adaptive filter coefficient occurs at a double talk segment. A double talk indicates that a near-end talker voice signal and an acoustic echo signal simultaneously exist at an input voice signal of a microphone, and double talk detection in an acoustic echo removing apparatus is a very important factor. Therefore, in order to prevent such double talk, while a near-end talker voice signal exists, the acoustic echo removing apparatus should temporarily stop updating of an adaptive filter coefficient, and for this purpose, a double talk detection apparatus notifying whether a near-end talker voice signal exists is required.

A double talk detection apparatus generally compares magnitudes of a far-end talker voice signal and an acoustic echo signal that is input to a microphone, and determines that a near-end talker voice signal exists if an acoustic echo signal is relatively larger than a far-end talker voice signal. This method can be simply embodied, but has a drawback that accuracy of double talk detection is deteriorated. Further, when the magnitude of a far-end talker voice signal is small, even if double talk occurs, the magnitude of an acoustic echo signal is not sufficiently large and thus it is difficult to find an accurate time point of double talk.

Another method of detecting double talk calculates a correlation between a near-end talker input signal and a far-end talker voice signal or a correlation between a far-end talker voice signal and an output signal of an adaptive filter and compares the correlations, and when the correlation is equal to or less than a threshold value, this segment is determined to be a double talk segment. However, this method has a high calculation amount, is sensitive to time delay, and requires a proposition condition that an adaptive filter should converge to a predetermined level or more. Further, when an adaptive filter does not converge to a predetermined level or more due to noise existing at a periphery of a near-end talker, there is a drawback that accuracy of double talk detection is deteriorated.

SUMMARY OF THE INVENTION

The present invention has been made in an effort to provide a method and apparatus for removing acoustic echo in a teleconference system having advantages of being capable of reducing a distortion phenomenon and improving echo removal performance at a double talk segment.

An exemplary embodiment of the present invention provides a method of removing acoustic echo in an acoustic echo removing apparatus. The method includes: receiving a plurality of microphone input signals through a plurality of microphones; detecting space information representing a location of a sound source using the plurality of microphone input signals; detecting a double talk segment using the space information; generating an acoustic echo estimation signal from a far-end talker voice signal using an adaptive filter coefficient that is used immediately before at the double talk segment; and generating an echo-removed signal by subtracting the acoustic echo estimation signal from one of the plurality of microphone input signals.

The method may further include: updating an adaptive filter coefficient using an immediately preceding echo-removed signal at a segment in which only an acoustic echo signal exists as a detection result of the double talk segment; and generating the acoustic echo estimation signal from the far-end talker voice signal using the updated adaptive filter coefficient.

The generating of the acoustic echo estimation signal may include determining not to update the adaptive filter coefficient at the double talk segment.

The method may further include outputting the echo-removed signal through a network.

The detecting of space information may include: calculating a level difference, a delay difference, and a correlation between the plurality of microphones input signals; and generating space information by combining at least one of the level difference, the delay difference, and the correlation.

The detecting of a double talk segment may include determining a double talk segment when a value of the space information deviates from a predetermined threshold range.

Another embodiment of the present invention provides an acoustic echo removing apparatus in a teleconference system. The acoustic echo removing apparatus includes a space information detector and an adaptive filter. The space information detector detects space information representing a location of a sound source using a plurality of microphone input signals that are received through a plurality of microphones. The adaptive filter generates an acoustic echo estimation signal from a far-end talker voice signal using an adaptive filter coefficient, detects a double talk segment using the space information, and determines update of the adaptive filter coefficient according to whether the double talk segment exists.

The acoustic echo removing apparatus may further include a subtraction unit. The subtraction unit may generate an echo-removed signal by subtracting the acoustic echo estimation signal from one of the plurality of microphone input signals.

The adaptive filter may determine a double talk segment when a value of the space information deviates from a predetermined threshold range.

The adaptive filter may generate the acoustic echo estimation signal using an adaptive filter coefficient that is used immediately before at the double talk segment.

The adaptive filter may update an adaptive filter coefficient using the immediately preceding echo-removed signal at a segment in which only the acoustic echo signal exists, and generate the acoustic echo estimation signal using the updated adaptive filter coefficient.

The space information detector may calculate a level difference, a delay difference, and a correlation between the plurality of microphones input signals, and generate space information by combining at least one of the calculated level difference, delay difference, and correlation.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, a method and apparatus for removing acoustic echo in a teleconference system according to an exemplary embodiment of the present invention will be described in detail with reference to the drawings.

Figure 1:
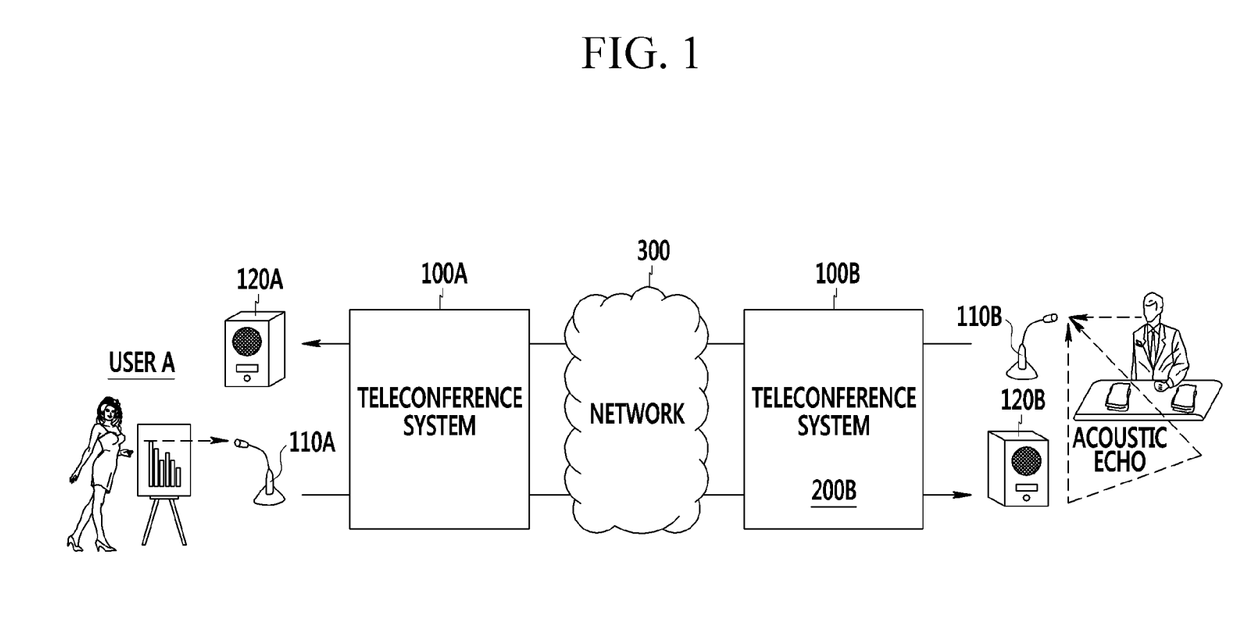
FIG. 1 is a diagram illustrating an example of a general teleconference system.

FIG. 1 is a diagram illustrating an example of a general teleconference system.

Referring to FIG. 1, teleconference systems 100A and 100B process voice signals of a user A and a user B that are input through microphones 110A and 110B, respectively, transfer the voice signals to a network 300, process another party's voice signal that is received from the network 300, and output the processed voice signal through at least one speaker 120A and 120B, respectively.

In such teleconference systems 100A and 100B, for example, so-called acoustic echo occurs in which a voice signal of the user A (far-end talker) that is output through the speaker 120B passes through an echo channel between the speaker 120B and the microphone 110B and is input to the microphone 110B.

Figure 2:
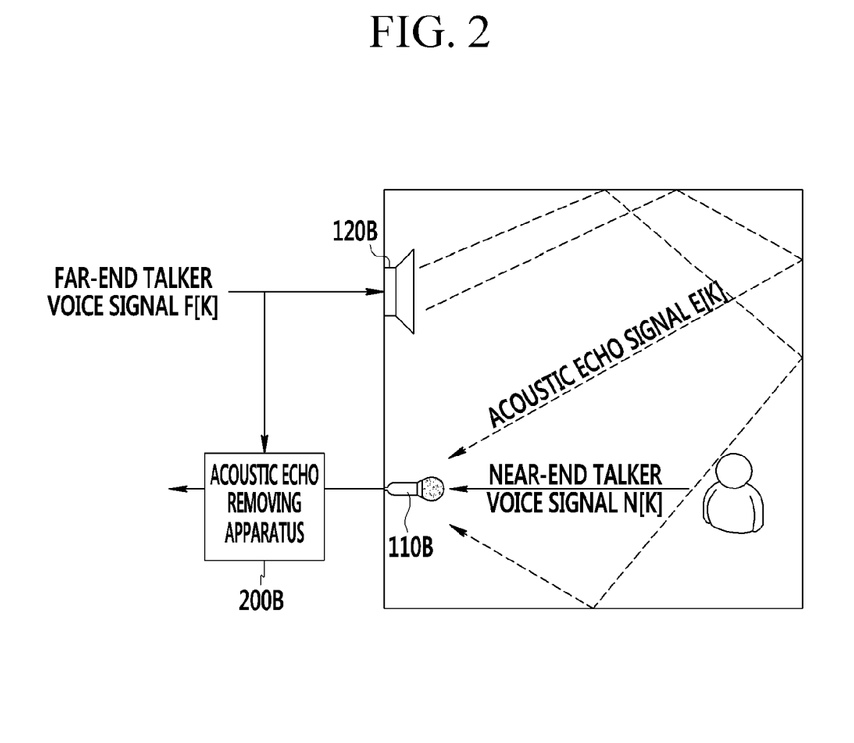
FIG. 2 is a diagram illustrating a concept of acoustic echo and an acoustic echo removing apparatus.

FIG. 2 is a diagram illustrating a concept of acoustic echo and an acoustic echo removing apparatus.

Referring to FIG. 2, a far-end talker voice signal f[k], which is a voice signal of a user A, is output to predetermined space through the speaker 120A, and passes through an echo path to be an acoustic echo signal e[k]. The acoustic echo signal is represented by Equation 1.

$$e[k] = \sum_{n=0}^{N-1} h[n]f[k-n] \qquad \text{(Equation 1)}$$

Herein, h[k] (k=0, . . . , N−1) is an echo path, and N is a length of an echo channel.

An acoustic echo signal that is generated in this way is input as an input signal of the microphone 110B together with a near-end talker voice signal n[k], which is a voice signal of a user B. An input signal m[k] of the microphone 110B is represented by Equation 2.

$$m[k]=e[k]+n[k] \qquad \text{(Equation 2)}$$

That is, the input signal m[k] of the microphone 110B is a signal in which a voice signal of the user B and an acoustic echo signal are combined, and normal communication between communication parties concerned is disturbed due to such an acoustic echo signal. Such acoustic echo inevitably occurs in the teleconference systems 100A and 100B, and thus the teleconference system 100B necessarily requires an acoustic echo removing apparatus 200B for removing acoustic echo.

Similarly, the teleconference system 100A necessarily requires an acoustic echo removing apparatus (not shown) for removing acoustic echo.

Figure 3:
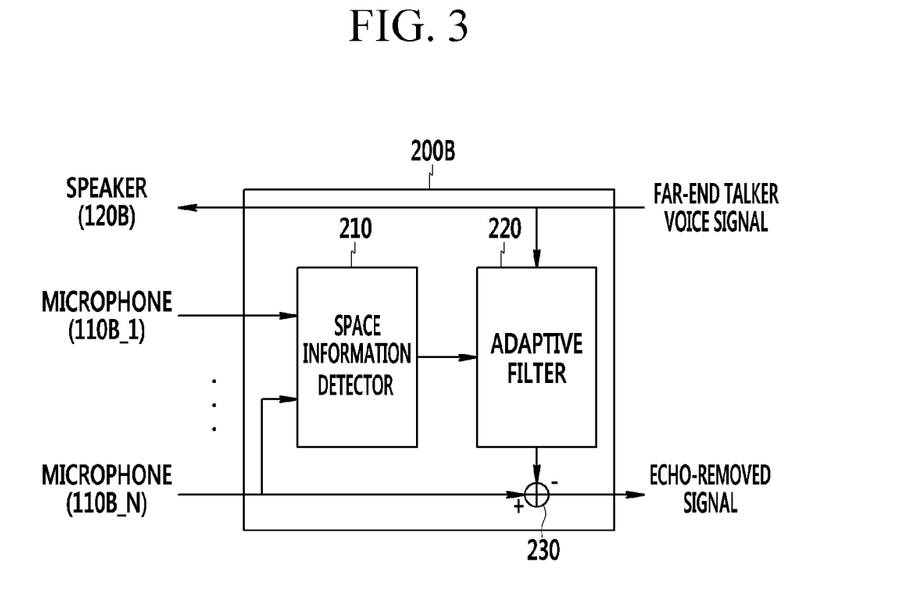
FIG. 3 is a block diagram illustrating an acoustic echo removing apparatus according to an exemplary embodiment of the present invention.

FIG. 3 is a diagram illustrating an acoustic echo removing apparatus according to an exemplary embodiment of the present invention.

Referring to FIG. 3, the acoustic echo removing apparatus 200B includes a space information detector 210, an adaptive filter 220, and a subtraction unit 230.

The space information detector 210 receives a microphone input signal through a plurality of microphones 110B_1, . . . , 110B_N, and detects space information between microphone input signals. Here, space information is an element that enables recognition of a location of a sound source in space, and arises from a fact that a person recognizes and distinguishes a location of a sound source using two ears. A characteristic element that enables a person to recognize and distinguish a location of a sound source using two ears includes interaural level difference (ILD), interaural time difference (ITD), and interaural correlation (IC).

That is, a time delay difference and a level difference of a signal that two ears recognize enables representation of a location and a characteristic of the sound source within a range that a person recognizes. Further, even when two different sound sources propagate with the same level difference, a recognition space perception changes according to a correlation level of a signal. A level difference, a delay difference, and a space perception that are recognized with two ears may be mapped to a level difference, a delay difference, and a correlation between sound sources that are input to the microphones 110B_1, . . . , 110B_N, and thus space information may be generated with one or a combination of interchannel level difference (ICLD), interchannel time difference (ICTD), and interchannel coherence (ICC). They are extracted on a subband basis in a frequency domain in order to extract an effective parameter based on a human hearing model, and a subband quantity generally uses 20-28 equivalent rectangular bandwidth (ERB) bands. Calculation methods of ICLD, ICTD, and ICC are already known technology, and thus a detailed description thereof will be omitted.

The ICLD represents a level difference of sound between sound sources, the ICTD represents a delay difference of sound between sound sources, and the ICC represents a mutual correlationship between sound sources.

That is, the space information detector 210 generates space information by combining at least one of a level difference, a delay difference, and a correlation between a plurality of microphone input signals that are received through the microphones 110B_1, . . . , 110B_N, and outputs the space information to the adaptive filter 220.

The adaptive filter 220 calculates a present adaptive filter coefficient using an immediately preceding echo-removed signal, and updates an adaptive filter coefficient to a present adaptive filter coefficient. The echo-removed signal is an output signal of the subtraction unit 230. The adaptive filter 220 generates an acoustic echo estimation signal using an adaptive filter coefficient from a far-end talker voice signal and outputs the acoustic echo estimation signal to the subtraction unit 230. The adaptive filter 220 may generate an acoustic echo estimation signal using an adaptive filtering algorithm such as an LMS algorithm or a NLMS algorithm. Adaptive filtering algorithms such as the LMS algorithm and the NLMS algorithm are already known technology, and therefore a detailed description thereof will be omitted.

The adaptive filter 220 detects a double talk segment using space information that is detected by the space information detector 210. When only an acoustic echo signal exists, the space information has a constant value, but at a double talk segment, because a near-end talker voice signal as well as an acoustic echo signal simultaneously exist, the space information value is changed to deviate from a range of a constant value. Therefore, the adaptive filter 220 can accurately detect a double talk segment through space information that is detected by the space information detector 210. At the double talk segment, because the adaptive filter coefficient of the adaptive filter 220 diverges, the adaptive filter 220 does not update the present adaptive filter coefficient and uses the immediately preceding adaptive filter coefficient as a present adaptive filter coefficient. That is, at a segment in which only an acoustic echo signal exists, the adaptive filter 220 updates the adaptive filter coefficient with the present adaptive filter coefficient that is calculated using the immediately preceding echo-removed signal, and stops update of the adaptive filter coefficient at a double talk segment and generates an acoustic echo estimation signal using the immediately preceding filter coefficient, thereby preventing divergence of the adaptive filter coefficient at a double talk segment.

The subtraction unit 230 generates an echo-removed signal by removing the acoustic echo estimation signal in a microphone input signal of one microphone 110B_N of the microphones 110B_1, . . . , 110B_N, and outputs the echo-removed signal through a network. Further, the echo-removed signal is input to the adaptive filter 220 to be used for updating the adaptive filter coefficient. The echo-removed signal may be generated as in Equation 3.

$$r[k]=m[k]-ê[k] \qquad \text{(Equation 3)}$$

Herein, r[k] is an echo-removed signal and is an output signal of the subtraction unit 230, and ê[k] is an acoustic echo estimation signal and is an output signal of the adaptive filter 220.

The subtraction unit 230 subtracts the acoustic echo estimation signal that is generated as an output of the adaptive filter 220 from the microphone input signal, thereby removing the acoustic echo component and improving sound quality.

When an adaptive filter coefficient of the adaptive filter 220 is updated, the acoustic echo removing apparatus 200B according to an exemplary embodiment of the present invention removes the acoustic echo component and improves the sound quality by applying space information between microphone input signals that are input from the plurality of microphones 110B_1, . . . , 110B_N.

Figure 4:
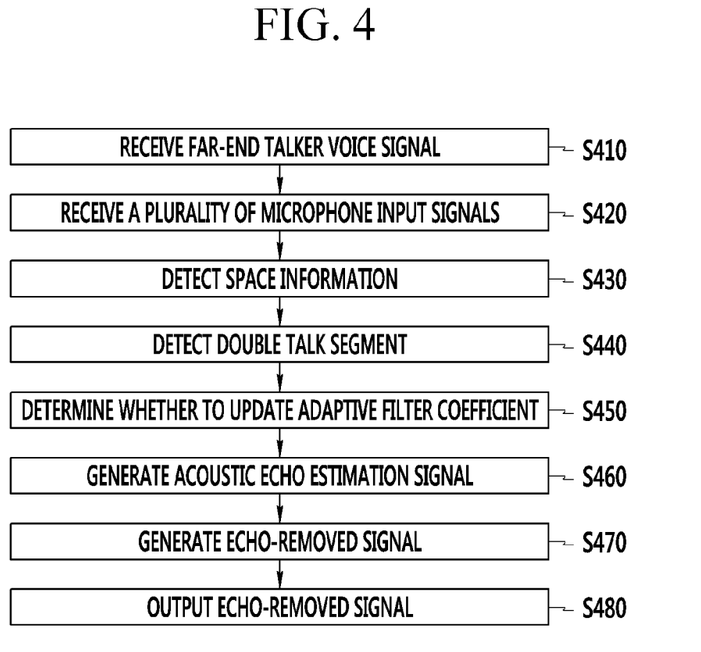
FIG. 4 is a flowchart illustrating a method of removing acoustic echo according to an exemplary embodiment of the present invention.

FIG. 4 is a flowchart illustrating a method of removing acoustic echo according to an exemplary embodiment of the present invention.

Referring to FIG. 4, a far-end talker voice signal is input to the acoustic echo removing apparatus 200B and is output through the speaker 120B.

The adaptive filter 220 of the acoustic echo removing apparatus 200B receives the far-end talker voice signal (S410). Further, the space information detector 210 of the acoustic echo removing apparatus 200B receives the plurality of microphone input signals through the plurality of microphones 110B_1, . . . , 110B_N (S420).

The space information detector 210 detects space information between the plurality of microphone input signals (S430). As described above, the space information detector 210 calculates a level difference, a delay difference, and a correlation between a plurality of microphones input signals and generates space information by combining the calculated level difference, delay difference, and correlation.

The adaptive filter 220 detects the double talk segment based on the space information (S440).

Thereafter, the adaptive filter 220 determines whether to update the adaptive filter coefficient according to whether a double talk segment exists (S450). The adaptive filter 220 calculates the present adaptive filter coefficient using the immediately preceding echo-removed signal at a segment in which only an acoustic echo signal exists, and updates the adaptive filter coefficient with the calculated present adaptive filter coefficient. The adaptive filter 220 uses the adaptive filter coefficient that is used immediately before as the adaptive filter coefficient instead of updating the adaptive filter coefficient at the double talk segment.

The adaptive filter 220 generates the acoustic echo estimation signal using the adaptive filter coefficient from the far-end talker voice signal (S460). The adaptive filter 220 generates the acoustic echo estimation signal using the updated adaptive filter coefficient at the segment in which only the acoustic echo signal exists, and generates the acoustic echo estimation signal using the adaptive filter coefficient that is used immediately before at the double talk segment.

The subtraction unit 230 generates an echo-removed signal by removing an acoustic echo estimation signal in a microphone input signal of one microphone 110B_N of microphones 110B_1, . . . , 110B_N (S470) and outputs the echo-removed signal through the network (S480). The echo-removed signal is input to the adaptive filter 220 and is used for updating the adaptive filter coefficient.

According to an exemplary embodiment of the present invention, accurate detection processing of a double talk segment can be performed with a simple calculation amount and memory addition for space information calculation between microphone input signals of a plurality of microphones, and thus a sound quality distortion phenomenon of an acoustic echo-removed signal can be reduced through accurate detection processing and thus sound quality and QoS can be improved, compared with an existing acoustic echo removing method.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of removing acoustic echo in an acoustic echo removing apparatus, the method comprising:
   receiving a plurality of microphone input signals through a plurality of microphones;
   detecting space information representing a location of a sound source using the plurality of microphone input signals;
   detecting a double talk segment using the space information;
   generating an acoustic echo estimation signal from a far-end talker voice signal using an adaptive filter coefficient that was used immediately prior to the double talk segment;
   generating an echo-removed signal by subtracting the acoustic echo estimation signal from one of the plurality of microphone input signals;
   updating an adaptive filter coefficient using an immediately preceding echo-removed signal at a segment in which only an acoustic echo signal exists as a detection result of the double talk segment; and
   generating the acoustic echo estimation signal from the far-end talker voice signal using the updated adaptive filter coefficient,
   wherein detecting the double talk segment comprises determining the double talk segment when a value of the space information deviates from a predetermined threshold range.

2. The method of claim 1, wherein generating the acoustic echo estimation signal using the adaptive filter coefficient comprises determining not to update the adaptive filter coefficient at the double talk segment.

3. The method of claim 1, further comprising outputting the echo-removed signal through a network.

4. The method of claim 1, wherein detecting the space information comprises:
   calculating a level difference, a delay difference, and a correlation between the plurality of microphones input signals; and
   generating the space information by using at least one of the level difference, the delay difference, and the correlation.

5. An acoustic echo removing apparatus in a teleconference system, the acoustic echo removing apparatus comprising:
   a space information detector that detects space information representing a location of a sound source using a plurality of microphone input signals that are received through a plurality of microphones;
   an adaptive filter that generates an acoustic echo estimation signal from a far-end talker voice signal using an adaptive filter coefficient, detects a double talk segment using the space information, determines the double talk segment when a value of the space information deviates from a predetermined threshold range, and determines to update of the adaptive filter coefficient according to whether the double talk segment exists; and
   a subtraction unit that generates an echo-removed signal by subtracting the acoustic echo estimation signal from one of the plurality of microphone input signals,
   wherein the adaptive filter updates an adaptive filter coefficient using an immediately preceding echo-removed signal at a segment in which only an acoustic echo signal exists as a detection result of the double talk segment, and generates the acoustic echo estimation signal from the far-end talker voice signal using the updated adaptive filter coefficient.

6. The acoustic echo removing apparatus of claim 5, wherein the space information detector further calculates a level difference, a delay difference, and a correlation between the plurality of microphones input signals, and generates the space information by using at least one of the calculated level difference, delay difference, and correlation.

7. A method of removing acoustic echo in an acoustic echo removing apparatus, the method comprising:
   receiving a plurality of microphone input signals through a plurality of microphones;
   detecting space information using the plurality of microphone input signals, the space information indicating a location of a sound source;
   detecting a double talk interval or an interval other than the double talk interval using the space information;
   maintaining an adaptive filter coefficient that was previously used when the double talk interval is detected;
   updating the adaptive filter coefficient when the other interval is detected; and
   generating an acoustic echo estimation signal according to a far-end talker voice signal using the maintained adaptive filter coefficient or the updated adaptive filter coefficient.

8. The method of claim 7, further comprising:
   generating an echo-removed signal by subtracting the acoustic echo estimation signal from one of the plurality of microphone input signals.

9. The method of claim 7, wherein the double talk interval is detected when a value of the space information lies outside a predetermined range.

\* \* \* \* \*